United States Patent [19]

Babel et al.

[11] Patent Number: 4,814,574

[45] Date of Patent: Mar. 21, 1989

[54] DEVICE FOR INJECTION OF LIQUID FOR MACHINING BY ELECTROEROSION

[75] Inventors: Bernard Babel, Geneve; Joseph Josserand, Cruseilles; Remi Gambin, Vetraz-Monthoux, all of France

[73] Assignee: Charmilles Technologies S.A., Meyrin, Switzerland

[21] Appl. No.: 121,228

[22] Filed: Nov. 16, 1987

[30] Foreign Application Priority Data

Nov. 26, 1986 [CH] Switzerland ............ 4749/86

[51] Int. Cl.$^4$ ............ B23H 7/10; B23H 7/36
[52] U.S. Cl. ............ 219/69 W; 204/206; 219/69 D
[58] Field of Search ............ 219/69 D, 69 W; 204/206, 224 M

[56] References Cited

U.S. PATENT DOCUMENTS

| 4,481,095 | 11/1984 | Inoue | 204/206 |
| 4,495,393 | 1/1985 | Janicke | 219/69 W |
| 4,628,172 | 12/1986 | Inoue | 204/206 |
| 4,634,825 | 1/1987 | Budin et al. | 219/69 D |
| 4,704,511 | 11/1987 | Miyano | 219/69 D |
| 4,709,131 | 11/1987 | Del Bello et al. | 219/69 D |
| 4,739,144 | 4/1988 | Shibata et al. | 219/69 D |

Primary Examiner—A. D. Pellinen
Assistant Examiner—Geoffrey S. Evans
Attorney, Agent, or Firm—Gifford, Groh, Sheridan, Sprinkle and Dolgorukov

[57] ABSTRACT

The device has a case (1) which has a wire guide (2) and a chamber (4) filled with machining liquid which is brought there under pressure by a pipe (7). A nozzle (5) in the shape of a truncated cone fits in the case and closes the chamber (4) in its normal working position by supporting its periphery on the flange (6) provided around the case (1), under the action of the pressure exerted by the dielectric liquid and if necessary by a return spring (8). The thrust exerted on the nozzle by an obstacle (10) during a lateral collision tilts the nozzle without damaging it and it causes at L an escape of liquid which causes the pressure to drop in the chamber (4). A transducer (13) signals the drop in pressure following the collision to the operator and/or to a control system of the erosion machine.

13 Claims, 2 Drawing Sheets

DEVICE FOR INJECTION OF LIQUID FOR MACHINING BY ELECTROEROSION

FIELD OF THE INVENTION

Background of the Invention

The present invention relates to a nozzle for the injection of machining fluid for an electroerosion machine and more particularly to means for such a machine for eliminating collisions of the injection nozzle with the piece to be machined or other elements.

THE PRIOR ART

In fact the users of machines machining by electroerosion (EDM), particularly EDM machines for cutting with a wire electrode, require higher and higher machining speeds, both in the roughing out and in finishing.

High-speed machining makes it necessary to place the nozzles for injecting the dielectric liquid as close as possible to the pieces to be machined (often some tenths of millimeters from them, sometimes even in contact with them) so as to inject at the required pressure a quantity of dielectric liquid sufficient for removing the particles of metal eroded as well as residues coming from the thermal cracking of the machining liquid. The injection which should be sufficiently powerful, is also useful for cooling the wire during the high-speed machining as well as for keeping the dielectric located between the wire and the piece in the liquid phase. Actually the high energy dissipated at this place during an intensive machining tends to transform this liquid into the gaseous phase.

To obtain a high injection pressure one might think of reducing the cross-section of the outlet of the injection nozzle.

However, this limits the angle of inclination which the wire may assume with respect to the axis of the nozzle without touching the latter, which causes problems during certain machining operations which require a high inclination of the wire. Moreover, experience has shown that the best machining conditions are obtained with a nozzle having an outlet diameter greater than a certain size. Hence the necessity of placing the orifice of the nozzle very close to the piece to be machined to minimize losses of charge between the two, in order to permit very high-speed machining. In practice, maintaining a very small distance—of the order of some tenths of millimeters—between the nozzle and the piece to be machined involves the danger of damaging the nozzle by collision with either the protruding parts of the piece to be machined or with the clamps or other elements serving to fix the latter for example. Thus the operator must foresee in advance all the possible collisions and take the necessary measured to avoid them, for example by altering the program which controls the machining path or by changing the way in which the piece is fixed on the machine. It goes without saying that such preparations make the machining operations substantially more expensive and slower. On the other hand, if these precautions are neglected and the nozzle as a result collides for example with a fastening clamp, either during a translation motion between two stages of a machining or during the cutting itself, this nozzle as well as certain of the fragile elements of the machining head on which it is mounted will generally be damaged or even made unusable and have to be replaced, resulting in a more or less long shutdown of the electroerosion machine and the cost of replacement parts.

It is possible to provide nozzles with shock-absorbing devices, such as the polyurethane washers described in U.S. Pat. No. 4,675,492, or else devices making it possible to place the orifice of the injection nozzle with a slight pressure against the part to be machined, which makes the nozzle capable of following the small irregularities of the piece, as described in the same U.S. Pat. No. 4,675,492. Numerous devices are also known which permit retracting the nozzle in case of a frontal impact.

SUMMARY OF THE PRESENT INVENTION

But none of these known devices make it possible to alleviate a lateral collision with an obstacle such as a fastening element of the piece to be machined for example. Generally, in accordance with the teaching of the state of the art, it was recommended to avoid collisions either by means of all sorts of systems or by programming the cutting trajectory or by complicated controls for controlling the distance between the nozzle and the pice to be machined. This is why the object of the present invention is an injection device having an injection nozzle for the machining liquid which is held in its operating position by a return force and is mounted in such a way that it can tilt out of its working position under the action of outside forces which are not parallel to the return force.

Such an arrangement makes it possible for the nozzle to yield not only by a vertical retraction during a frontal collision, that is in an axial direction, but also by swinging around a horizontal axis during a lateral collision.

With an injection nozzle arranged according to the present invention, lateral and frontal collisions are thus much less serious than with known nozzles, both for the nozzle itself and for the elements, which are often fragile and sensitive to impacts, mounted in the machining head on which the nozzle is fixed. This makes it possible to simplify the controls and the programming of the relative movements between the machining head and the piece to be machined. This in particular makes useless or superfluous the minute controls for the height of the machining head as a function of the thickness of the piece to be machined as well as the precautions to be observed (and to be programmed) for bringing the nozzle into he machining position while avoiding a frontal impact with the piece to be machined, or else programming the cutting path while allowing for all obstacles, such as the elements retaining the piece to be machined, which may be in the machining zone.

According to one of the preferred embodiments of the present invention, the injection device is provided with a system transmitting a signal when the nozzle leaves its working position. This signal may be transmitted to the digital control of the EDM machine. This makes it possible to act on numerous parameters, particularly those controlling the stopping or slowing down of the machining, the position of the machining head in question along the axis Z, and the injection power of the machining fluid. Thus the relative movement between the nozzle and the piece to be machined can be interrupted to avoid any damage to the nozzle or to the elements sensitive to impacts mounted in the machining head. But most of all, it is no longer necessary to stop the machining in case of collision. It is sufficient to slow it down, to move the nozzle away from the piece and then to reestablish the rapid conditions once the nozzle has passed over the obstacle, operations which can be carried out automatically, without the involvement of an operator.

Such a system may also make it possible to determine (and if necessary to control) the distance separating the orifice of the nozzle from the piece to be machined. For example, the hydraulic pressure prevailing inside the nozzle or the flow rate of the fluid can be measured continuously and a system be provided which transmits a signal when this pressure or the flow rate varies as a result, for example, of a retraction or a tilting of the nozzle or as a result of a variation in the distance separating the nozzle from the piece to be machined. This signal may be sent, for example, to the digital control of the EDM machine and make it possible automatically to vary the machining conditions as a function of the variation measured in the pressure or the flow rate, as well as, if necessary, the height of the machining head above or below the piece, or the pressure and the flow rate with which the nozzle is fed.

As it is possible to maintain the nozzle at a given distance from the piece, a piece whose surfaces are not smooth or flat or are oblique can be machined at the highest possible speed. It is also possible to machine on the edges of the piece and to stop the machining automatically when the path reaches the edge of the latter.

Another advantage is due to the fact that a drop in pressure or flow rate also occurs when the motion of the tool electrode approaches a path already machined or the edge of the piece, where the nozzle crosses over the edge or a groove already machined. In these two cases it is just desirable to obtain an automatic slowing down of the machining, because in these two cases there is a danger of breaking the wire electrode. Thus it is not necessary to program this slowing down. It is also possible to get around tight curves of the trajectory or manage machinings very close to the edge of the piece while reducing the risk of breaking of the wire by having the machining conditions adapted without complicated programming to the variations of the injection power of the machining fluid (and to the geometry of the path).

The machining fluid injection device according to the present invention may have an infinity of embodiments. Only certain ones of the possible modifications will be illustrated diagrammatically as examples in the attached drawings.

DETAILED DESCRIPTION OF THE PREFERRED EMBODIMENT OF THE PRESENT INVENTION

Figure 1:
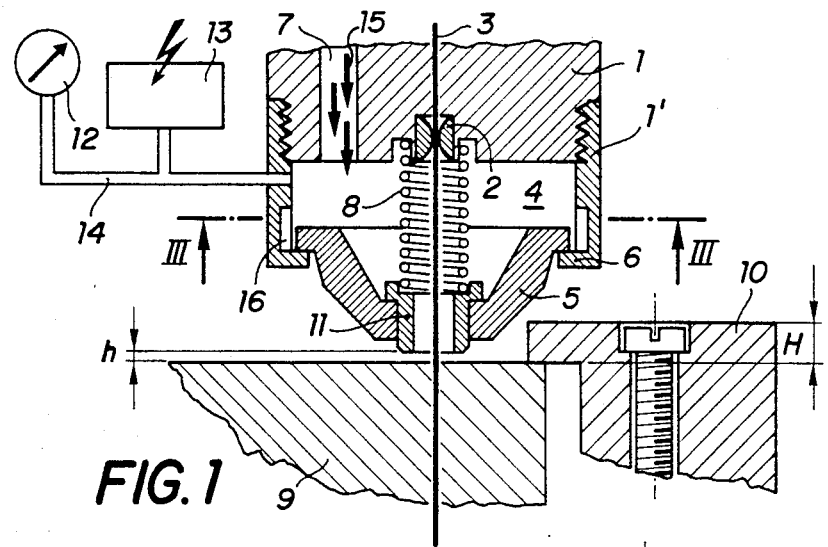
FIG. 1 represents a section of one embodiment of the invention with the nozzle in the working position.

FIG. 1 shows a device according to the invention in its working position, that is with its axis arranged vertically. The numeral 1 designates the case of the injection device in which is mounted the upper wire guide 2 of the machine for machining by electroerosion. This carrier element 1 forms part of the upper machining head of the machine, a head which is not shown in toto on the drawing to make it clear and because it is well known to one skilled in the art, as is the rest of the machine for electroerosion by wire. This machine also has a lower machining head which in its essentials is generally symmetrical with the upper head and which for this reason is likewise not represented. The case 1 is provided with a threaded ring 1'. A wire electrode 3 is stretched between the upper wire guide 2 and the lower wire guide (not represented) to cut by electroerosion a piece 9 held on the machining table of the machine by means of a fastening clamp 10.

At the lower part of the carrier element 1 the ring 1' delimits a chamber 4 for the machining liquid, this ring being provided with an inside flange 6 on which rests the periphery of a conical injection nozzle 5 which forms the bottom of the chamber 4. In order that this nozzle may not act as an electrode and thus accidentally be machined itself by the wire, it is preferable that it be made of an insulating material, for example of plastic. The machining liquid 15 is brought at a certain pressure to the chamber 4 through a channel 7 provided in the case. The pressure of this liquid as well as a return spring 8 thrust the periphery of the nozzle 5 against the flange 6 and permit the nozzle 5 to come to fit with tight sealing on the case 1 and thus also prevent the liquid from escaping between the two. In addition the spring 8 acts as a jet-breaker by keeping the flow of liquid coming from the channel 7 from exerting too great a lateral force on the wire 3 and from bending it in an undesirable way. The bore size of the wire guide 2 is generally only a little larger than the section of the wire 3, which prevents the machining liquid from escaping in any appreciable amount through this opening. Nonetheless, an extra joint (not represented) may be provided around the wire if desired. At its lower part the nozzle 5 has an orifice for directing the liquid toward the piece to be machined 9, or more exactly toward the interior of the space created by the machining between the wire and the piece. This space, in which the electrical discharges take place, is generally called a gap. Although the output of the machining liquid from the chamber 4 may be done directly through this orifice, it is preferable to provide the orifice with a cylindrical nose-piece 11 capable of sliding in this orifice, as explained below in reference to FIG. 2.

Figure 2:
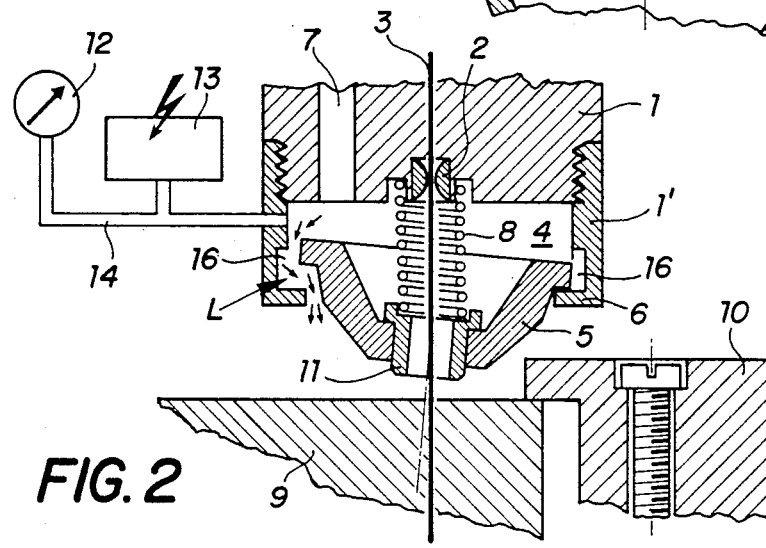
FIG. 2 represents the arrangement of FIG. 1 when a lateral force is exerted on the nozzle.

FIG. 2 shows the device of FIG. 1 in a position where the conical nozzle 5 has collided with the fastening clamp 10 of the piece to be machined, because the cutting path passes too close to this clamp the height H of which above the piece 9 is greater than the free height h between this same piece and the nose-piece 11. The force which the clamp 10 exerted on the nozzle shows a component directed to the left in FIG. 2 and a component directed upward in this Figure. The ratio between these components depends on the conicity of the nozzle, on its coefficient of friction, etc. Thus these parameters will be chosen depending on the circumstances in such a way that the force exerted by the clamp 10 on the nozzle causes the latter to tilt as shown in FIG. 2, which causes it to be raised off of the flange 6 at the position marked L in this Figure. In this oblique position, there is an escape of liquid between the nozzle 5 and the flange 6 as indicated by arrows, which causes a drop in the pressure on the chamber 4. This drop in pressure is displayed on a manometer 12 which is connected with the chamber 4 by a pipe 14. A pressure-current transducer 13 branched off of the same pipe is arranged so as to transmit an electrical warning signal at the time of such a drop in pressure. This signal may be used to warn the operator. It is preferably used to act adequately on the operating sequence of the machining by means of the digital control of the machine by, for example, making it possible to slow down the machining while the nozzle "jumps" over the obstacle. One skilled in the art or the control of the machine will choose without difficulty, depending on the circumstances between a large number of possible actions to take when a pressure drop is signaled by the transducer. This drop may be due to a lateral or frontal collision or else to the arrival of the nozzle at the edge of the piece to be machined or to the overlapping by the latter of a groove already machined.

Figure 3:
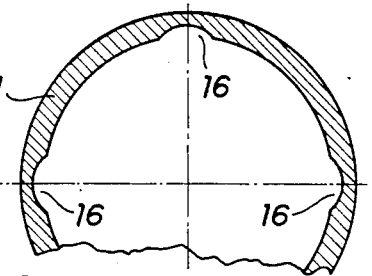
FIG. 3 is a section along III—III of FIG. 1, FIGS. 4a and 4b illustrate other embodiments of the nozzle, and FIG. 5 diagrammatically shows a circuit controlling the machining impulses as a function of the hydraulic pressure in the injection nozzle.

Among these actions one may mention as an example the following: slowing down of totally stopping the machining with the additional transmission of an alarm signal; slowing down or stoppage of the motors (not represented) which ensures the relative lateral movement of the wire relative to the piece or the longitudinal advance of the wire; vertical motion of the upper machining head; increase in the pressure or the flow rate of the machining fluid, etc. To amplify the pressure drop when the nozzle raises up off its seat on one side or the other, one or a plurality of cavities 16 are provided at the case of the lateral walls of the chamber 4, as is seen in particular in FIG. 3. These cavities form diversion channels which facilitate the escape of liquid when the nozzle leaves the flange 6 at any point whatever on its periphery. Thus they prevent an increase in the pressure exerted by the liquid in the chamber 4 when the nozzle starts to raise up and at the same time accentuate the drop in pressure following the leakage of liquid between the nozzle and its seat.

It may be noted that if, due to an error in the programming of a cutting by wire, or else when this cutting is ended, the wire electrode 3 is located at the edge of the piece and the outlet opening of the injection device is clear of this piece, the pressure in this chamber 4 will likewise drop to a sufficiently low value to set off, by means of the transducer 13, either an alarm signal or the stopping of the machining process or any other appropriate step.

Now will be described in more detail the operation of the nose-piece 11 mounted to slide in the orifice of the nozzle 5. Experience has shown that, to obtain an efficient injection, especially in the case of high-speed machining, it is of advantage to leave only a very small space h between the outlet of the injection device and the surface of the piece to be machined. Under these conditions it is difficult to avoid any accidental contact between the latter and the said device, particularly when the nozzle is made of a plastic which can easily be warped by the pressure prevailing in the chamber 4, or for any other reason, said contact resulting in the wear and abrasion of said nozzle. Moreover since the machining liquid is essentially incompressible, the pressure and any vertical force exerted on the nozzle 5 is transmitted almost totally to the case 1, the section of the nozzle 5 being the same as that of the case 1, and across the latter to the machining head which carries it, which runs the risk of creating warpings harmful to the precision of the machining. For these reasons the orifice of the nozzle 5 is provided with an interchangeable and cylindrical nose-piece 11, preferably made of insulating material to prevent untimely short circuits, and which can easily slide in an axial direction in the orifice. It will slide against the force of the spring 8 without appreciably increasing the pressure inside the chamber 4. Since its section is low with respect to that of the chamber 4, only a part of the force exerted on it will be transmitted to the machining by the liquid present in the chamber 4. Moreover, the nose-piece 11 is inexpensive and may be easily replaced when it is desired to vary the cross-section of the outlet orifice for the liquid or when the nose-piece is worn by friction on the piece 9. To prevent any deterioration of the latter as a result of such friction, it is possible to make the nose-piece 11 of a plastic with low hardness, such as "Teflon" for example. FIGS. 1 and 2 show a cylindrical nose-piece 11. But it is evident that this piece may be of any other shape, for example that of a cone widening out toward the inside of the nozzle, which shape however will permit it to slide toward the interior of the nozzle.

Figures 4A, 4B:
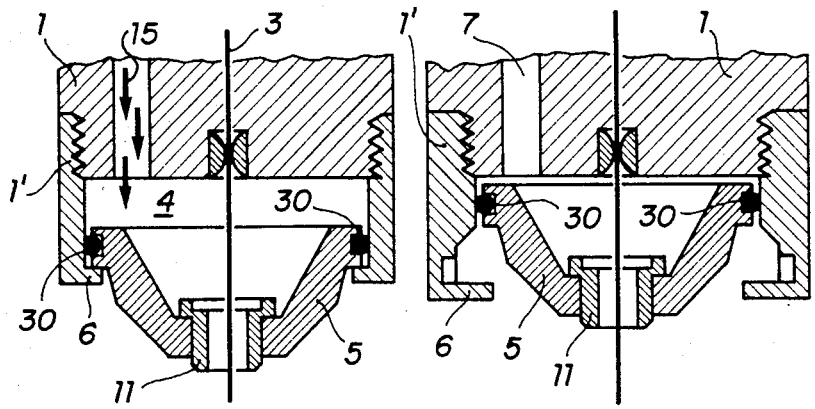

The spring 8 illustrated in FIGS. 1 and 2 is optional, the hydraulic pressure of the machining liquid prevailing in the chamber 4 being sufficient to keep the nozzle 5 in its working position. The spring may moreover be replaced by other elastic elements of a known type, such as an O-ring joint 30 installed in a circular notch made on the rim of the periphery of the nozzle 5 (see FIGS. 4a and 4b). This system permits the nozzle to remain wedged in a rest position, as a result of a frontal impact for example. A device such as that represented in FIG. 4a serves to "harden" the movement of the nozzle in the case 1. In particular it makes it possible to provide controls in the absence of pressure in the chamber 4 by "wedging" the nozzle in the "high" position (or the rest position: its periphery is close to the top of the chamber 4) or "low" position (working position: its periphery is in contact with the flange 6). It may be arranged in such a way as to have no effect when the pressure is established in the chamber 4 (FIG. 4b).

Instead of measuring the pressure prevailing in the chamber 4 and creating electrical signals based on these measurements, it is possible to measure the feed flow rate of the nozzle in order to create electrical signals.

If it is desired to keep the height h of the spacing between the outlet of the injection device and the piece 9 to be machined at a set point $h_o$ during the machining, it is possible to use the value of the pressure in the chamber 4 to determine the effective height h at any moment. This determination, which makes allowance for the characteristics of the pump delivering the liquid to the chamber 4, for the viscosity of the liquid, the dimensions of the gap, etc., is a routine matter for one skilled in the art. He may also make a circuit—possibly controlled by a program—for calculating and transmitting to the digital control a signal depending on the pressure (or the flow rate) and serving to control the spacing between the piece and the injection device in such a way as to maintain a spacing with a predetermined value h or to make it vary according to a preestablished program. The simplest method of determining the pressure set point $p_o$ corresponding to a set point $h_o$ for the spacing evidently consists in measuring the pressure which becomes established in the chamber 4 under the prevailing machining conditions, after having adjusted the spacing of the value $h_o$ by optical, mechanical, hydraulic or other means.

Moreover, the measurement of pressure in the chamber 4 an be used for regulating the frequency and amplitude of the electrical discharges generated between the wire and the piece to be machined.

When the nozzle strikes against an obstacle, the pressure in the chamber 4 drops, either due to the passage of dielectric liquid through the diversion channels or because the orifice of the nozzle is no longer parallel to the surface of the piece to be machined. The dielectric fluid then is no longer injected at the required pressure and in a sufficient quantity into the gap, which could lead to a break in the wire.

This situation and the danger of a break occur not only when the nozzle strikes against an obstacle but in numerous other cases, including the following: when the machine carries out a machining close to one or more than one slits already machined in the piece (during a pucketing operation), during a machining near the edge of a piece or near an opening in the latter, when the lower or upper plane of the piece is irregular (extrusion dies of aluminum), etc.

All of these cases involve a bad irrigation of the wire. The slowing down (or stopping) of the machining which, due to the device according to the present invention, results automatically from the drop in pressure or flow rate detected in the chamber 4, are obviously favorable measures which contribute to reducing the danger of breaking the wire electrode.

Figure 5:
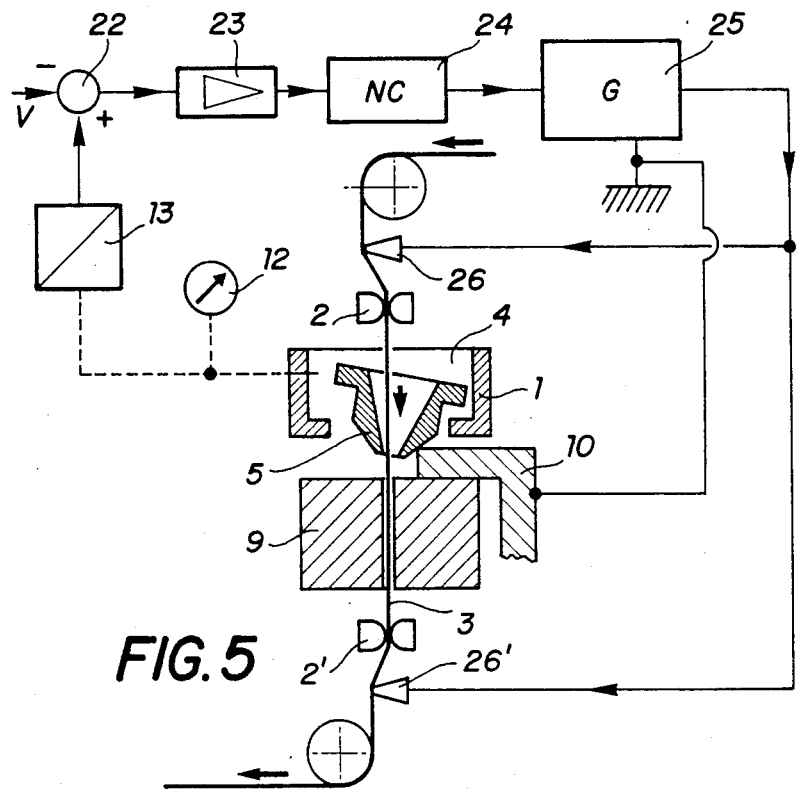

FIG. 5 illustrates an embodiment of a circuit for regulating the machining current, for example by acting on the frequency of the discharges as a function of the machining liquid pressure in the nozzle 5. In this Figure the nozzle 5 happens to collide with a clamp 10 serving to fix the piece to be machined 9. The wire electrode 3 passes into a guide 2, then through the machining zone, and then over a second guide 2', to be finally drawn out of the machining zone. The pressure inside the chamber 4 is measured by a manometer 12 and converted into an electrical signal by a transducer 13. A comparator 22 compares this signal with a signal V which corresponds to a set point for the pressure in the chamber 4. The comparator transmits a signal representing the difference between those two signals to an amplifier 23 the output signal of which is then transmitted to the digital control 24 of the EDM machine. The latter develops a control signal as a function of the signal received which control signal acts on the generator 25 supplying machining impulses in such a way as to alter their frequency in the desired manner as a function of the variations in pressure in the chamber 4. The machining impulses are led to the wire 3 in the usual manner by the contacts outline at 26 and 26'. As said above, the flow rate of the machining liquid can be advantageously measured instead of the pressure in the chamber 4.

Although I have described several embodiments of the present invention, it should be apparent to one with only ordinary skill in the art that other changes and modifications can be made as well, without departing from the spirit of the invention.

I claim:

1. A device for the injection of machining liquid for cutting by electroerosion by means of a wire electrode, comprising, in combination: wall means forming a case having an open end; a nozzle having a central orifice through which said machining wire passes and said machining liquid is injected, said nozzle projecting through the open end of said case in a working position and cooperating with said wall means to form a chamber; a pump connected to said chamber so as to introduce said machining liquid under pressure creating a seating force which at least in part maintains said nozzle in said working position in sealing relationship with said wall means; said nozzle being mounted in said chamber relative to said wall means so as to retract in the case of a frontal impact or tilt around an infinity of instantaneous axes of horizontal rotation under the action of external forces which are not parallel to said seating force to create a free passage between said wall means and said nozzle for the flow of machining liquid.

2. The device as defined in claim 1, characterized in that the outside of the nozzle has a surface in the shape of a truncated cone, shaped in such a way as not to remain blocked against a lateral obstacle.

3. The device as defined in claim 1, characterized in that at least a part of the seating force is exerted by an elastic element joining the case to the nozzle.

4. The device as claimed in claim 3 characterized in that at least a part of the seating force is exerted by an elastic element constituted by a spring.

5. The device as defined in claim 1, characterized by a removable nose-piece mounted in the orifice of the nozzle in such a way as to be able to slide vertically and to be kept in its working position by the seating force.

6. The device as defined in claim 5, characterized by a cylindrical nose-piece.

7. The device as defined in claim 1, characterized by one of said case and nozzle having adjacent to said open end, diversion channels enlarging the free passage between said wall means and said nozzle when the later tilts or retracts out of its working position.

8. The device as defined in claim 1, characterized in that the chamber connects with a hydraulic-electric transducer arranged to transmit electrical signals as a function of the pressure prevailing in the chamber or the flow rate of the machining liquid feeding the later.

9. The device as defined in claim 8, characterized by the fact that it also has means arranged for communicating the electrical signals transmitted by the transducer to the digital control of an EDM machine.

10. The device as defined in claim 8, characterized by the fact that it also has a controller controlled by electrical signals transmitted by the transducer and arranged to create, as a function of the signals transmitted by the latter, a control signal suitable for acting on the generator of impulses of an EDM machine.

11. The device as defined in claim 8, characterized by means arranged to create a signal suitable for acting on at least one motor serving to move the piece to be machined relative to the wire electrode or to control the vertical position of the nozzle.

12. The device as defined in claim 8, characterized by means arranged for creating, as a function of certain electrical signals transmitted by the transducer, a signal causing the stopping of the machining.

13. The device as defined in claim 8, characterized by the fact the control signal created by the transducer causes a drop in the frequency of the machining discharge.

* * * * *